(12) United States Patent
Kim et al.

(10) Patent No.: US 7,912,524 B2
(45) Date of Patent: Mar. 22, 2011

(54) PORTABLE TERMINAL WITH SLIDING MODULE USING MAGNETIC SUBSTANCES

(75) Inventors: Yong-Gyun Kim, Seoul (KR); Young-Ki Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1011 days.

(21) Appl. No.: 11/786,740

(22) Filed: Apr. 12, 2007

(65) Prior Publication Data
US 2007/0249413 A1    Oct. 25, 2007

(30) Foreign Application Priority Data

Apr. 12, 2006    (KR) .................. 10-2006-0033288

(51) Int. Cl.
*H04M 1/00*    (2006.01)
(52) U.S. Cl. ................. 455/575.4; 455/575.1
(58) Field of Classification Search .............. 455/575.1, 455/575.4
See application file for complete search history.

(56) References Cited

U.S. PATENT DOCUMENTS

| | | | |
|---|---|---|---|
| 6,822,871 B2 | 11/2004 | Lee et al. | |
| 7,672,699 B2 * | 3/2010 | Kim et al. | 455/575.4 |
| 2005/0000059 A1 | 1/2005 | Sung et al. | |
| 2006/0046796 A1 * | 3/2006 | Park et al. | 455/575.4 |

FOREIGN PATENT DOCUMENTS

| | | |
|---|---|---|
| CN | 1741721 | 3/2006 |
| EP | 1 592 209 A2 | 2/2005 |
| EP | 1 631 043 A1 | 1/2006 |
| WO | WO 2004/112267 A1 | 12/2004 |

* cited by examiner

*Primary Examiner* — Nick Corsaro
*Assistant Examiner* — Gerald Johnson
(74) *Attorney, Agent, or Firm* — The Farrell Law Firm, P.C.

(57) ABSTRACT

A portable terminal having a sliding module includes a first housing; a second housing coupled to the first housing while facing the first housing; and a sliding module interposed between the first and second housings, for connecting the first housing to the second housing so that the first housing linearly moves on the second housing. The sliding module includes a sliding plate disposed on a surface of the first housing and facing the second housing; a first magnetic substance mounted in the first housing; and a second magnetic substance mounted in the second housing and facing the first magnetic substance. The first and second magnetic substances are arranged in longitudinal and transverse directions of the first housing, respectively, to move the first housing in the longitudinal or transverse direction of the first housing by driving force caused due to attractive and repulsive forces between the first and second magnetic substances.

23 Claims, 7 Drawing Sheets

PORTABLE TERMINAL WITH SLIDING MODULE USING MAGNETIC SUBSTANCES

PRIORITY

This application claims priority to an application entitled "Portable Terminal with Sliding Module" filed with the Korean Intellectual Property Office on Apr. 12, 2006 and assigned Serial No. 2006-33288, the contents of which are incorporated herein by reference.

BACKGROUND OF THE INVENTION

1. Field of the Invention

The present invention relates to a portable terminal, and more particularly to a sliding module of a sliding type portable terminal by which a first housing slides on a second housing so as to open and close a part of the second housing.

2. Description of the Related Art

Conventional portable terminals may be classified into various types according to their appearance, such as bar-type portable terminals, flip-type portable terminals, and folder-type portable terminals.

The bar-type portable terminal has a single housing on which data input/output means, a transmitter and a receiver are mounted. Since a keypad used as the data input/output means is always exposed, it may malfunction. Further, there is a limitation in the miniaturization of the portable terminal because it is difficult to secure a distance between the transmitter and the receiver.

The flip-type portable terminal includes a body, a flip panel, and a hinge module connecting the flip panel to the body. The body of the flip-type portable terminal has data input/output means, a transmitter, and a receiver mounted thereon. In the flip-type portable terminal, the flip panel can cover a keypad used as the data input/output means, so as to prevent the malfunctioning of the keypad. However, there is an actual limitation in the miniaturization of the flip-type portable terminal because it is difficult to provide a sufficient distance between the transmitter and the receiver.

The folder-type portable terminal includes a body, a folder, and a hinge module connecting the folder to the body. The folder rotates so as to be opened and closed. In a state that the folder is in close contact with the body, the portable terminal is set in a communication standby mode, and thus is prevented from malfunctioning. In a communication mode, the folder is unfolded so that a sufficient distance between the transmitter and the receiver is obtained. Thus, there is an advantage of miniaturizing the folder-type portable terminal.

Meanwhile, according to diversification of designs of the portable terminals, sliding type portable terminals, which respectively include two housings one of which slides on the other housing, have been commercialized.

U.S. Pat. No. 6,822,871 B2, issued Nov. 23, 2004, discloses a portable terminal and a sliding module for the same, in which two housings are coupled to each other in pair so as to slide. In the disclosed portable terminal, one of the housings opens and closes a part of the other housing, specifically a keypad, while sliding on the other housing. One housing of the portable terminal has a spring module coupled thereto while the other housing has a rail shaped sliding guide coupled thereto, so that the spring module and the sliding guide allow the pair of housings to slide.

However, in the conventional sliding type portable terminal, a spring mounted in a sliding module to supply a driving power to the terminal occupies a considerable space in the housing enclosing the sliding module, thereby making it difficult to miniaturize the sliding type portable terminal. Therefore, many parts and mounting space are required and thereby cause an increase in the manufacturing cost. Further, as a sliding movement is limited in a direction, there is a limitation to a space for receiving keys. Furthermore, there is a problem in that a user cannot use a portable terminal according to a content provided by service provider and user's taste.

SUMMARY OF THE INVENTION

Accordingly, the present invention has been made to solve the above-mentioned problems occurring in the prior art, and an object of the present invention is to provide a portable terminal having a sliding module, which allows a miniaturization of a hinge unit.

Another object of the present invention is to provide a portable terminal having a sliding module, in which the number of parts and a mounting space can be reduced so as to decrease the manufacturing cost.

Still another object of the present invention is to provide a portable terminal having a sliding module, which can slide bi-directionally.

In order to accomplish these objects, according to a first aspect of the present invention, there is provided a portable terminal having a sliding module that includes a first housing: a second housing coupled to the first housing while facing the first housing; and a sliding module interposed between the first and second housings, for connecting the first housing to the second housing so that the first housing linearly moves on the second housing, which includes: a sliding plate disposed on a surface of the first housing and facing the second housing; a first magnetic substance mounted in the first housing; and a second magnetic substance mounted in the second housing and facing the first magnetic substance, wherein the first and second magnetic substances are arranged in longitudinal and transverse directions of the first housing, respectively, so as to move the first housing in the longitudinal or transverse direction of the first housing by driving force caused due to attractive and repulsive forces between the first and second magnetic substances.

According to a second aspect of the present invention, there is provided a portable terminal having a sliding module, which comprises: a first housing; a second housing coupled to the first housing while facing the first housing; and a sliding module interposed between the first and second housings, for connecting the first housing to the second housing so that the first housing linearly moves on the second housing. The sliding module includes a sliding plate disposed on a surface of the first housing and facing the second housing; a first magnetic substance mounted in the first housing; and a second magnetic substance mounted in the second housing and moving on the sliding plate in a direction that the first magnetic substance extends, wherein the first magnetic substance is arranged in longitudinal and transverse directions of the first housing, respectively, so as to move the first housing in the longitudinal or transverse direction of the first housing by driving force caused due to attractive and repulsive forces between the first and second magnetic substances.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described with reference to the accompanying drawings. In the following description of the present invention, a detailed description of known functions and configurations incorporated herein is omitted to avoid making the subject matter of the present invention unclear.

Figure 1:
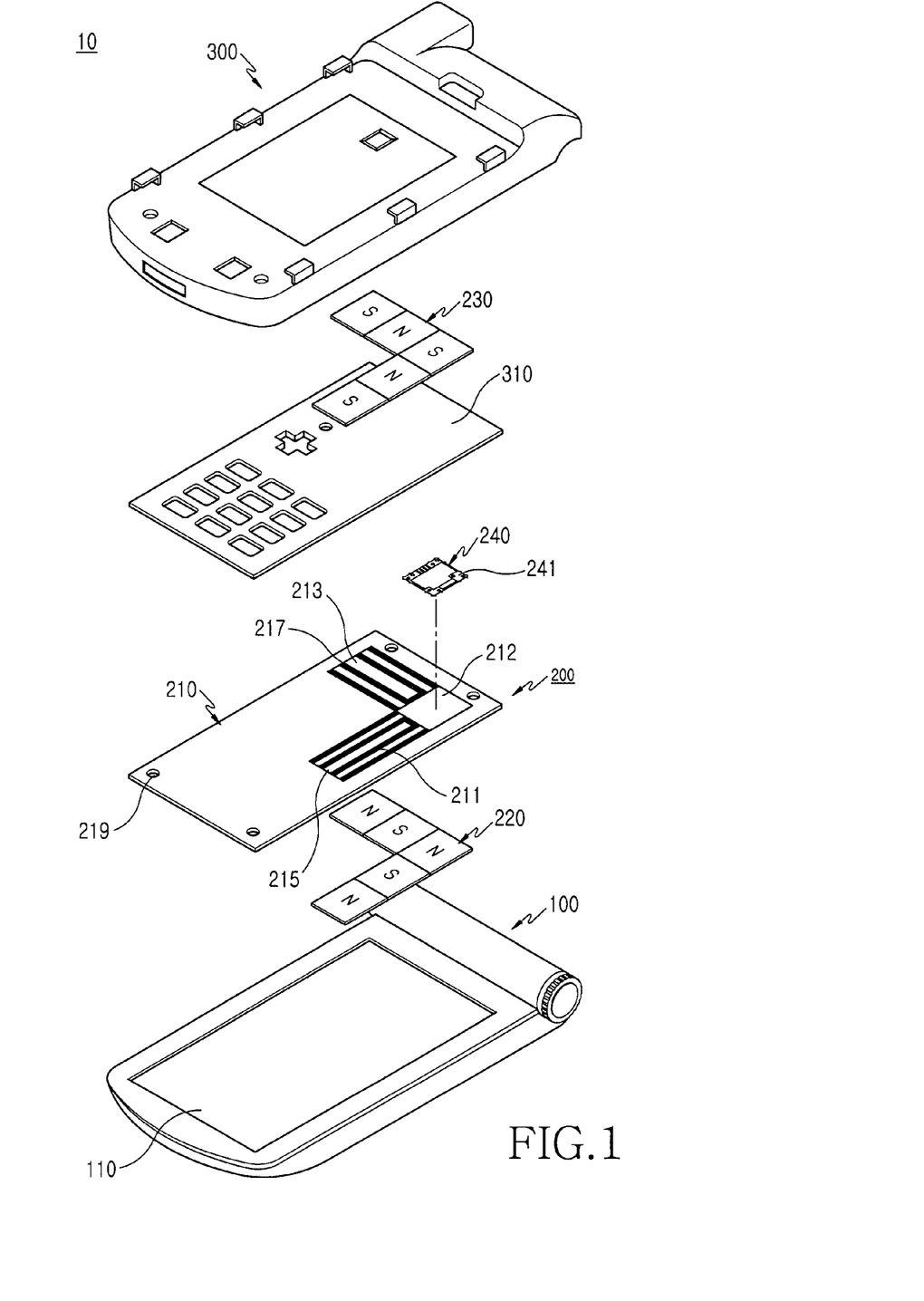
FIG. 1 is an exploded perspective view showing a portable terminal having a sliding module according to a first embodiment of the present invention.
Figure 2:
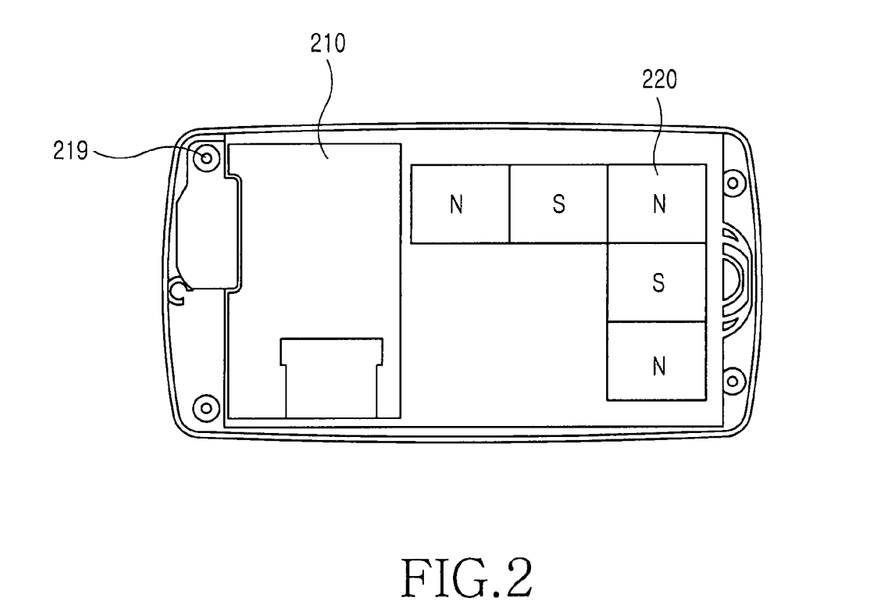
FIG. 2 is a plane view showing a sliding plate of the sliding module for the portable terminal shown in FIG. 1.
Figure 3:
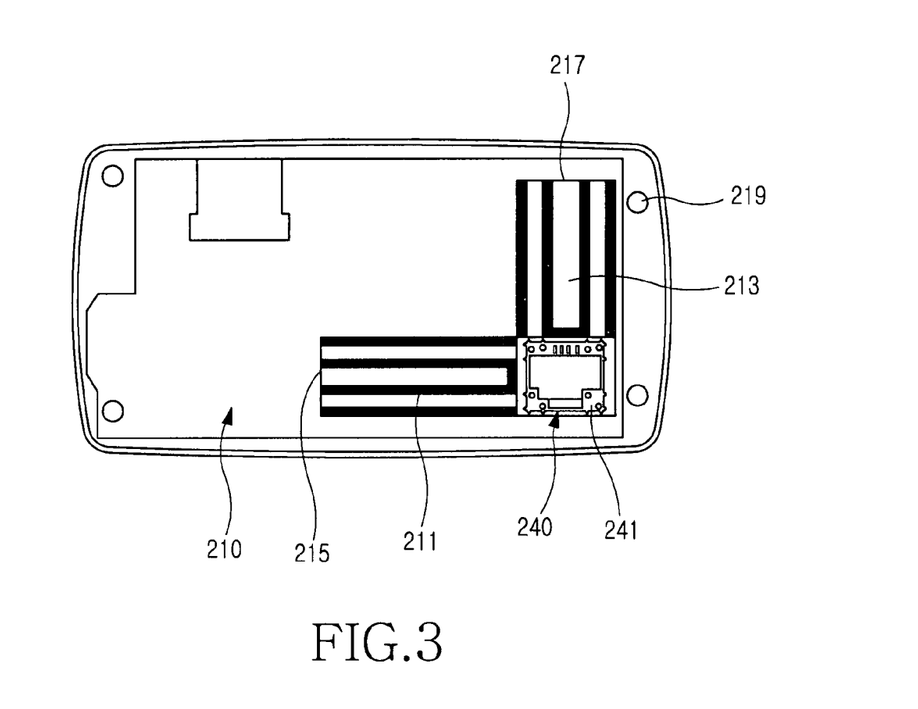
FIG. 3 is a bottom view showing the sliding plate shown in FIG. 2.

As shown in FIGS. 1 to 3, the portable terminal 10 includes a first housing 100, a second housing 300, and a sliding module 200.

Figure 4:
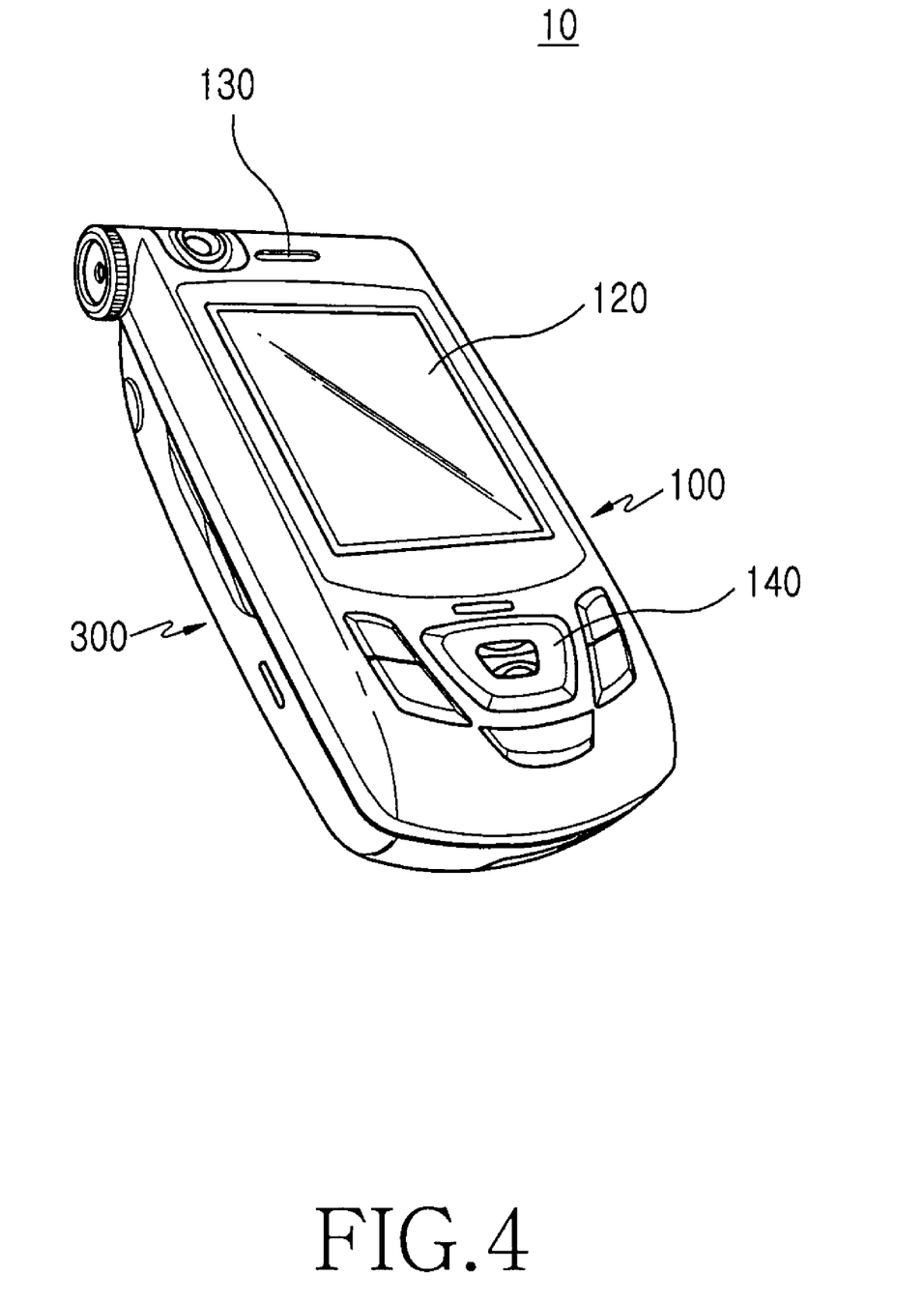
FIG. 4 is a perspective view showing the portable terminal shown in FIG. 1.
Figure 5:
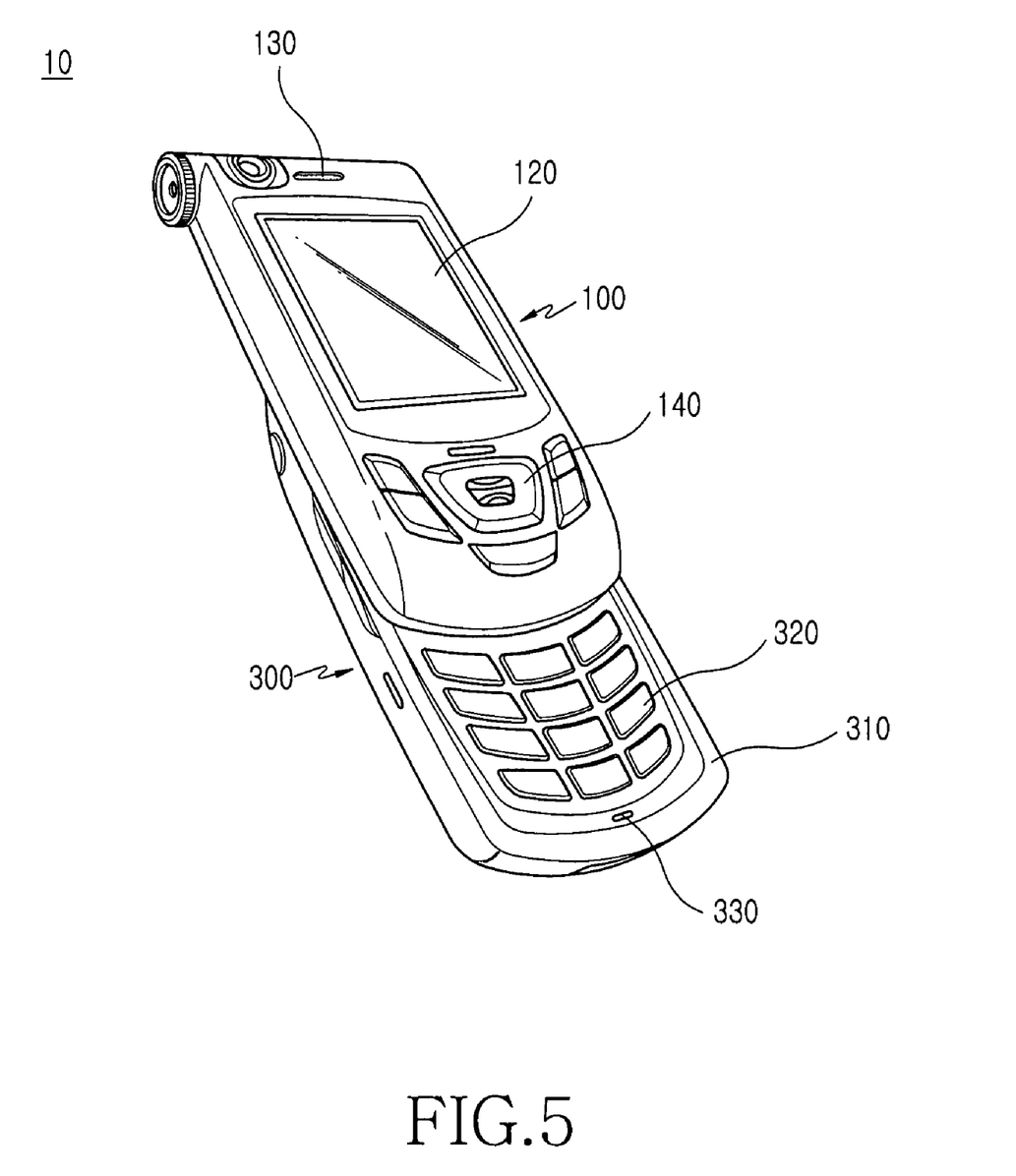
FIG. 5 is a perspective view showing the portable terminal shown in FIG. 1, in which a first housing of the portable terminal slides in a longitudinal direction.
Figure 6:
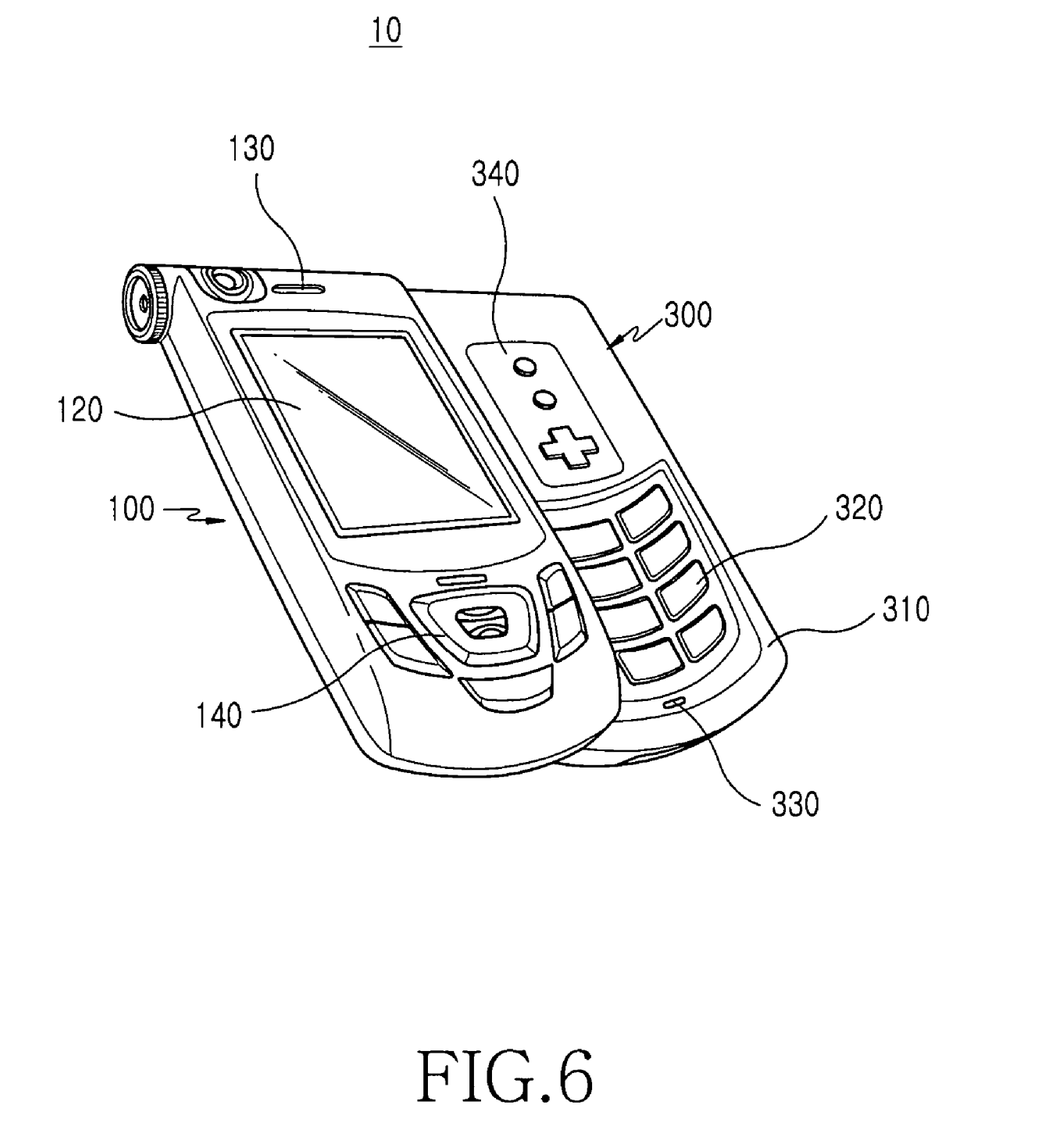
FIG. 6 is a perspective view showing the portable terminal shown in FIG. 1, in which the first housing of the portable terminal slides in a transverse direction.

Referring to FIGS. 4 to 6, the portable terminal 10 includes a display unit 120, a receiver 130, and function keys 140, which are disposed on a surface of the first housing 100, and a keypad unit 320, a transmitter 330, and a keypad unit 340 used for playing games, which are disposed on a surface of the second housing 300. The first and second housings 100 and 300 are coupled to each other by means of the sliding module 200 so that the first housing 100 slides to open and close the surface of the second housing 300 on which the keypad unit 320, the transmitter 330, and the keypad unit 340 for playing games are arranged.

The sliding module 200 includes the sliding plate 210, a first magnetic substance 220, a second magnetic substance 230, and a sliding shifter 240, which are interposed between the first and second housings 100 and 300. The first housing 100 is coupled to the second housing 300 to linearly move in longitudinal and transverse directions.

The sliding plate 210 has two planar surfaces, where the first magnetic substance 220 is disposed on one surface thereof, and plate holes 219 are formed at an edge thereof.

The sliding plate 210 is assembled with the first housing 100 where one surface of the sliding plate 210 faces a seating surface 110 of the first housing 100, and the other surface faces the second housing 300. Screws (not shown) can be used as coupling means for coupling the sliding plate 210 to the first housing 100, and extend through the plate holes 219, respectively, so as to be screwed to the first housing 100. Therefore, the sliding plate 210 is assembled with the first housing 100 so that one surface faces the first housing 100 and the other surface faces the second housing 300.

The sliding plate 210 further includes first and second sliding guides 211 and 213, an intersection guide 212, and first and second guide stoppers 215 and 217, which are formed on the other surface of the sliding plate 210.

The first sliding guide 211 is formed in a longitudinal direction of the first housing 100 to provide a pathway for the first housing 100 when moving in a longitudinal direction. The second sliding guide 213 extends perpendicular to the first sliding guide 211, and is formed in a transverse direction of the first housing 100, to provide a pathway for the first housing 100 when moving in the transverse direction. In addition, as ends of the first and second guides 211 and 213 intersect each other, the intersection guide 212 is formed.

The first guide stopper 215 is positioned at the other end of the first sliding guide 211 and is formed perpendicular to the extension direction of the first sliding guide 211, to close the other end of the first sliding guide 211. Further, the second guide stopper 217 is positioned at the other end of the second sliding guide 213 and is formed perpendicular to the second sliding guide 213, to close the other end of the second sliding guide 213.

The first magnetic substance 220 is a permanent magnet, which is attached to one surface of the siding plate 210 and received in the first housing 100. The first magnetic substance 220 is attached to the sliding plate 210 by an insert-injection method. Specifically, a substance to be magnetized is already disposed in a mold, and attached to the sliding plate 210 while the sliding plate 210 is molded. Then, the first magnetic substance 220 is obtained through a process for magnetizing the substance attached to the sliding plate 210.

The first magnetic substance 220 is arranged along the first and second sliding guides 211 and 213 in longitudinal and transverse directions of the first housing 100. The first magnetic substance 220 has polarities, i.e. N-S-N, which are arranged in the longitudinal and transverse directions, respectively, while having an N polarity at an intersecting portion. On the other hand, it is understood that if the first housing 100 also is manufactured by injection molding, the sliding plate 210 can be integrated with the first housing 100 during the molding of the first housing 100.

The second magnetic substance 230 is a permanent magnet, which is attached to one surface of the housing cover 310 and received in the second housing 300. The second magnetic substance 230 is attached to the housing cover 310 while facing the first magnetic substance 220. The second magnetic substance 230 is manufactured by insert-injection molding a substance on the housing cover 310 and then magnetizing it. The second magnetic substance has polarities, i.e. S-N-S, which are arranged in the longitudinal and transverse directions, respectively, while having an S polarity at an intersecting portion. On the other hand, it is understood that if the second housing 300 also is manufactured by injection molding, the sliding plate 210 can be integrated with the second housing 100 during the molding of the second housing 300.

The sliding shifter 240 has shifter holes 241 formed at an edge of a surface thereof, and is coupled to the second housing 300 while facing the second housing 300. Screws can be used as coupling means for coupling the sliding shifter 240 to the second housing 300. The screws extend through the shifter holes 241, respectively, and then are screwed to the second housing 300. The sliding shifter 240 is assembled with the second housing 300 and engaged with the first and second sliding guides 211 and 213 to slide on the sliding plate 210. Thus, the first and second housings 100 and 300 can be slid by the sliding module 200.

The movement direction of the sliding shifter 240 can be partially limited depending on the position of the sliding shifter 240 on the sliding plate 210. When the sliding shifter 240 is positioned at the intersection guide 212, the sliding shifter 240 can move either in a longitudinal direction or in a transverse direction.

The sliding shifter 240 positioned on the first sliding guide 211 can freely move in the longitudinal direction of the first housing 100 in a range from the intersection guide 212 to the first guide stoppers 215. However, when the sliding shifter 240 is positioned between the intersection guide 212 and the first guide stopper 217, the sliding shifter 240 cannot move in the transverse direction of the first housing 100.

Similarly, the sliding shifter 240 positioned on the second sliding guide 213 can freely move in a range from the intersection guide 212 to the second guide stopper 217 in the transverse direction of the first housing 100. However, when the sliding shifter 240 is positioned between the intersection guide 212 and the second guide stopper 217, the sliding shifter 240 cannot move in the longitudinal direction of the first housing 100.

Referring to FIGS. 4 and 5, the operation of the first housing 100, which moves in the longitudinal direction thereof to open one surface of the second housing 300 in the state that the portable terminal 10 is closed, will be described.

When the first housing 100 closes over the second housing 300, the first magnetic substance 220 having N-S-N polarities faces the second magnetic substance 230, so as to generate attractive force. Therefore, the overlapping of the first and second housings 100 and 300 is stably maintained. In addition, the sliding shifter 240 is positioned on the intersection guide 212, and is ready to move in either longitudinal or transverse direction.

On the other hand, as a user moves the first housing 100 upwardly, the same polarities of the first and second magnetic substances 220 and 230 face each other, so as to generate repulsive force. As a result, the sliding shifter 240 is subjected to driving force which acts either in a direction from the first sliding guide 211 to the first stopper 215 or in a direction to the intersection guide 212.

At this time, if the user intends to open one surface of the second housing 300, the user moves the first housing 100 farther upward. As a result, the attractive force and the repulsive force are simultaneously generated between the first and second magnetic substances 220 and 230, and thereby the sliding shifter 240 is automatically moved to the first guide stopper 215 so that the first housing 100 allows the one surface of the second housing 300 to be exposed.

When the sliding shifter 240 comes into contact with the first guide stopper 215, the attractive force generated between an N polarity of the first magnetic substance 220 and an S polarity of the second magnetic substance 230 stably maintains the open status of the first and second housings 100 and 300. Accordingly, the user can perform functions such as voice communication and transfer of a short message using the exposed keypad unit 320 and the transmitter 330.

In the state that the portable terminal 10 is opened, a closing of the one surface of the second housing 300 is carried out in reverse order with relation to the opening of the portable terminal 10 in such a manner that the first housing 100 moves downward in the longitudinal direction thereof.

Referring to FIGS. 4 and 6, the operation of the first housing 100 which moves in the transverse direction thereof so as to open one surface of the second housing 300, in the state that the portable terminal 10 is closed, will be described.

When the first housing 100 closes the second housing 300, the first magnetic substance 220 having N-S-N polarities faces the second magnetic substance 230 having S-N-S polarities so as to generate attractive force. Therefore, the overlapping of the first and second housings 100 and 300 is stably maintained. In addition, the sliding shifter 240 is positioned on the intersection guide 212 and is ready to move either in the longitudinal direction or in the transverse direction.

As the user moves the first housing 10 transversely, the same polarity of the first and second magnetic substances 220 and 230 face each other so as to generate repulsive force. Thus, the sliding shifter 240 is subjected to driving force which acts either in a direction from the second sliding guide 213 to the second guide stopper 217 or in a direction to the intersection guide 212.

At this time if the user intends to open one surface of the second housing 300, the user can transversely move the first housing 100 further more. As a result, the attractive force and the repulsive force are simultaneously generated so as to cause the sliding shifter 340 to automatically move to the second guide stopper 217, so that the first housing allows the second housing 300 to exposed its one surface.

When the sliding shifter 240 comes into contact with the second guide stopper 217, the attractive force is generated between the positive pole N of the first magnetic substance 220 and the negative pole S of the first magnetic substance 230, so as to stably maintain the open state of the first and second housings 100 and 300. Therefore, the user can more conveniently use game content provided in the portable terminal 10 by using the exposed keypad unit 340 for playing the game. Further, while carrying out the voice communication, the user can open and close the first housing 100 according to his/her taste and circumstance.

In the state that the portable terminal 10 is opened, a closing of the one surface of the second housing 300 is carried out in reverse order with relation to the opening of the portable terminal 10 in such a manner that the first housing 100 moves in the transverse direction thereof.

Figure 7:
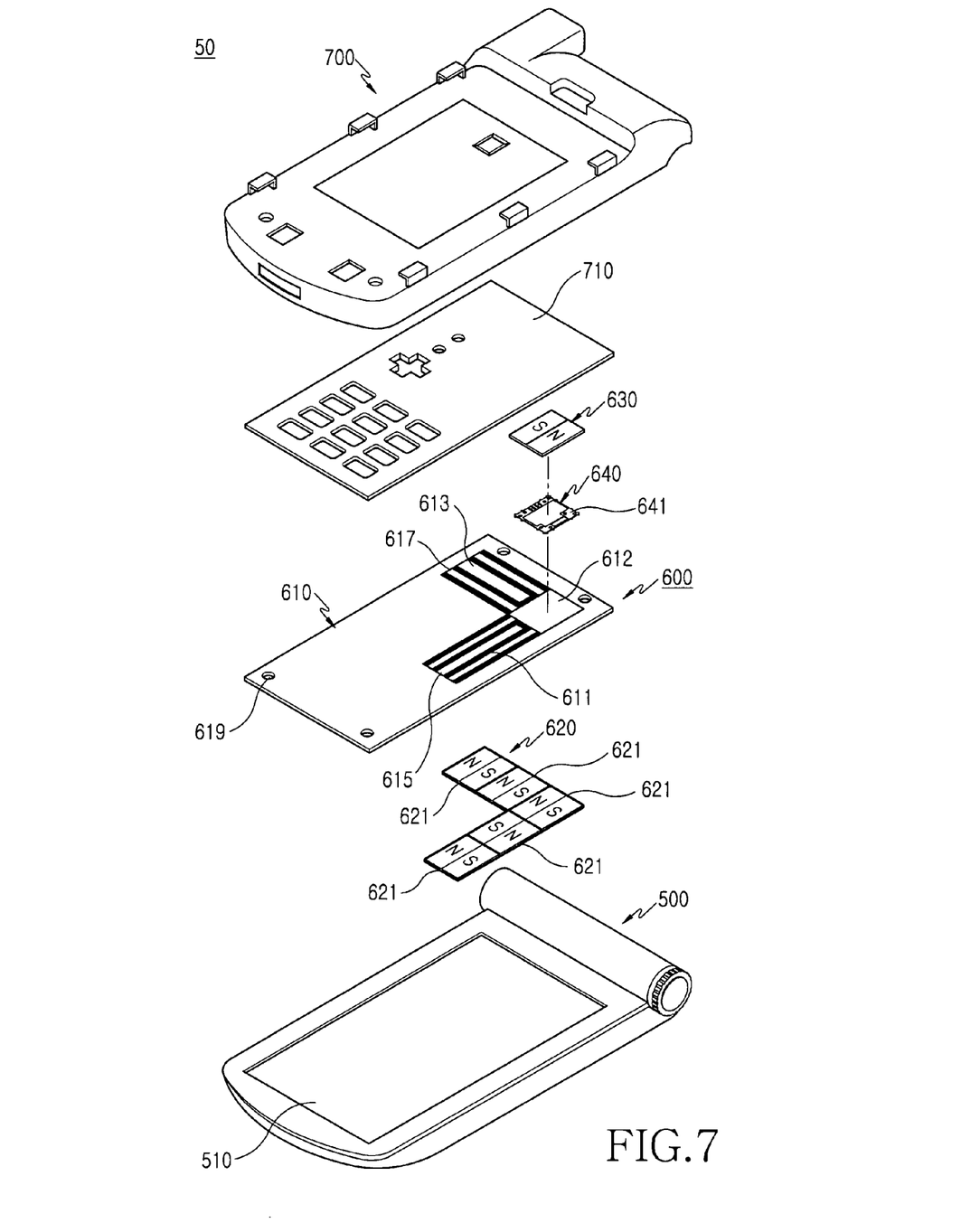
FIG. 7 is an exploded perspective view showing a portable terminal having a sliding module according to a second embodiment of the present invention.

FIG. 7 is an exploded perspective view showing the portable terminal 50 having a sliding module 600 according to a second embodiment of the present invention. As shown in FIG. 7, the portable terminal 50 includes a first housing 500, a second housing 700, and the sliding module 600.

The sliding module 600 includes a sliding plate 610, a first magnetic substance 620, a second magnetic substance 630, and a sliding shifter 640, by which the first housing 500 is coupled to the second housing 700 so as to linearly move in a longitudinal and transverse directions.

The sliding plate 610 has two planar surfaces, where the first magnetic substance 620 is disposed on one surface thereof, and plate holes 619 are formed at an edge thereof.

The sliding plate 610 is assembled with the first housing 500 where one surface of the sliding plate 610 faces a seating surface 510 formed on the surface of the first housing 500, and the other surface of the sliding plate 610 faces the second housing 700. Screws (not shown) can be used as coupling means for coupling the sliding plate 610 to the first housing 500, and extend through the plate holes 519, respectively, so as to be screwed to the first housing 500. Therefore, the sliding plate 610 can be assembled with the first housing 500 so that one surface faces the first housing 500 and the other surface faces the second housing 700.

The sliding plate 610 further includes first and second sliding guides 611 and 613, an intersection guide 612, and first and second guide stoppers 615 and 617, which are formed on the other surface of the sliding plate 610.

The first sliding guide 611 is formed in a longitudinal direction of the first housing 500, so as to provide a pathway for the first housing 500 when moving in a longitudinal direction. The second sliding guide 613 extends perpendicular to the first sliding guide 611 and is formed in a transverse direction of the first housing 500, so as to provide a pathway for the first housing 500 when moving in the transverse direction. In addition, as ends of the first and second guides 611 and 613 intersect each other, the intersection guide 612 is formed.

The first guide stopper 615 is positioned at the other end of the first sliding guide 611 and is formed perpendicular to the extension direction of the first sliding guide 611, so as to close the other end of the first sliding guide 611. Further, the second guide stopper 617 is positioned at the other end of the second sliding guide 613 and is formed perpendicular to the second sliding guide 613, so as to close the other end of the second sliding guide 613.

The first magnetic substance 620 is a permanent magnet, which is attached to one surface of the siding plate 610 and received in the first housing 500. The first magnetic substance 620 is obtained through a process for magnetizing the substance which is attached to the sliding plate 610 by insert-injection molding. The first magnetic substance 620 has a structure in that magnetic substance cells 621 having S-N polarities or N-S polarities are arranged along the first and second guides 611 and 613. In the first magnetic substance 620, the magnetic substance cells 621 having N-S, S-N, and N-S polarities are sequentially arranged in a longitudinal direction so that two poles, i.e. positive and negative poles are engaged with another two poles, i.e. negative and positive poles, respectively, so as to generate attractive force, while the magnetic substance cells 621 having N-S, S-N, and N-S polarities are arranged in a transverse direction so that negative or positive pole is engaged with opposing pole so as to generate the attractive force. The intersection cell, in which one of the longitudinal cells intersects with one of the transverse cells, has the N-S polarity. On the other hand, it is understood that if the first housing 500 is also manufactured by injection molding, the sliding plate 610 can be integrated with the first housing 500 during the molding of the first housing 500.

The second magnetic substance 630 is a permanent magnet, which is attached to one surface of the housing cover 710. The second magnetic substance 630 is attached to the housing cover 310 after being assembled with the sliding shifter 640. The second magnetic substance 630 has an S-N polarity in a transverse direction of the first housing 500, and enough size to be assembled with the sliding shifter 640.

The sliding shifter 640 has shifter holes 641 formed at an edge of a surface thereof, and is coupled to the second magnetic substance 630 so as to face the second housing 700. Screws (not shown) can be used as coupling means for coupling the sliding shifter 640 to the second housing 700. The screws extend through the shifter holes 641, respectively, and then are screwed to the second housing 700. The sliding shifter 640 is assembled with the second housing 700 and engaged with the first and second sliding guides 611 and 613 so as to slide on the sliding plate 610. Thus, the first and second housings 500 and 700 can be slid by the sliding module 600.

The movement direction of the sliding shifter 640 can be partially limited depending on the position of the sliding shifter 640 on the sliding plate 610. When the sliding shifter 640 is positioned at the intersection guide 612, the sliding shifter 640 can move either in the longitudinal direction or in the transverse direction.

The sliding shifter 640, positioned on the first sliding guide 611, can freely move in the longitudinal direction of the first housing 500 in a range from the intersection guide 612 to the first guide stoppers 615. However, when the sliding shifter 640 is positioned between the intersection guide 612 and the first guide stopper 615, the sliding shifter 640 cannot move in the transverse direction of the first housing 700.

Similarly, the sliding shifter 640 positioned on the second sliding guide 613 can freely move in a range from the intersection guide 612 to the second guide stopper 617 in the transverse direction of the first housing 500. However, when the sliding shifter 640 is positioned between the intersection guide 612 and the second guide stopper 617, the sliding shifter 640 cannot move in the longitudinal direction of the first housing 500.

The sliding module 600 according to the present invention is somewhat different from the preceding embodiment, with relation to the arrangement of the polarities of the first and second magnetic substances 620 and 630. However, it is easily understood that as the first housing 500 moves, the driving force is generated by the attractive force and the repulsive force between the first and second magnetic substances 620 and 630. Therefore, the operation of the sliding module 600 according to the present embodiment will be omitted.

Figure 8:
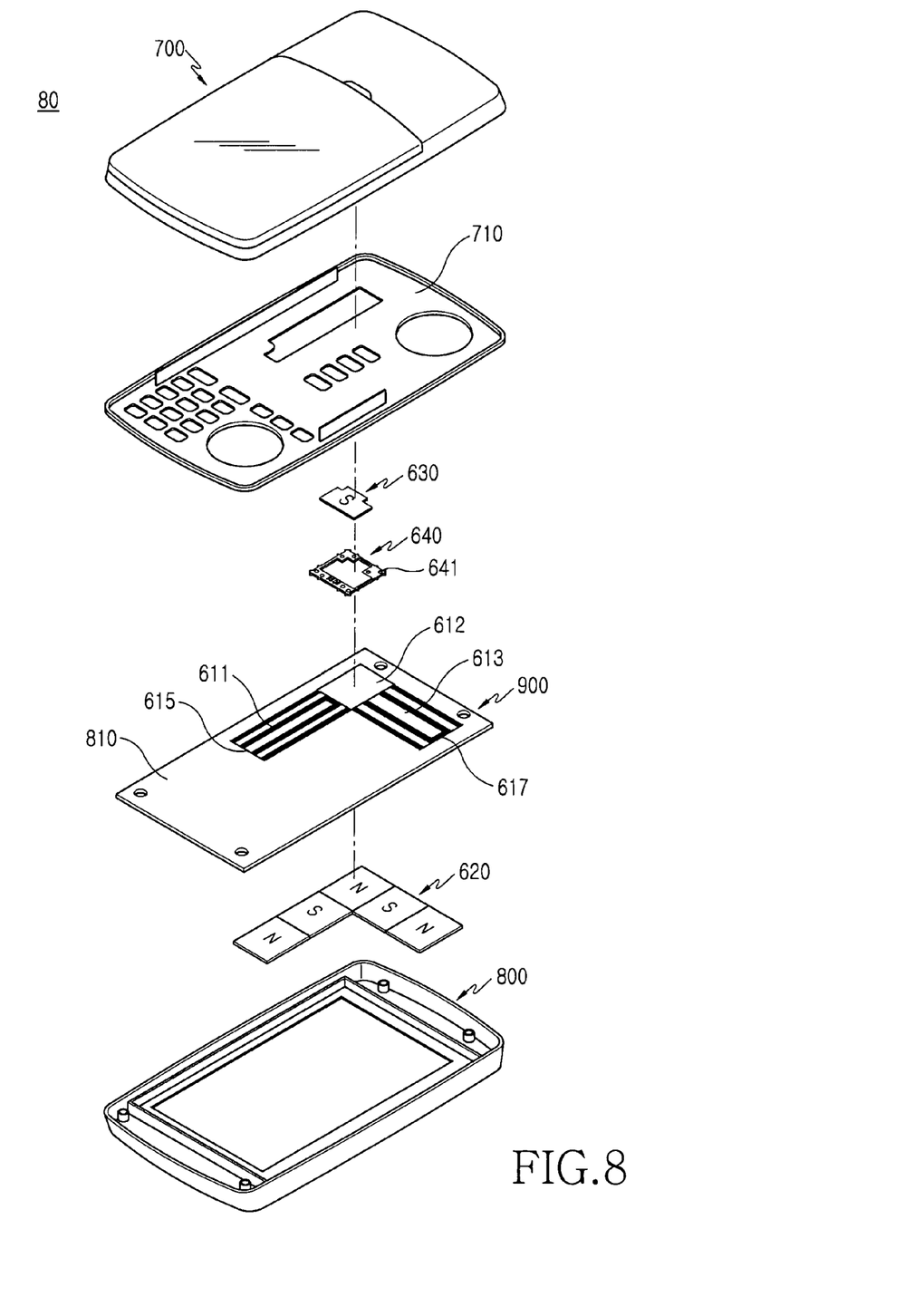
FIG. 8 is an exploded perspective view showing a portable terminal having a sliding module according to a third embodiment of the present invention.

FIG. 8 is an exploded perspective view showing a portable terminal 80 having a first housing 800, a second housing 700, and a sliding module 900 according to a third embodiment of the present invention. The sliding module 900 of the portable terminal 80 is different from the first and second embodiments because the first magnetic substance 620 is attached to a rear case 810 of the first housing 800 of the portable terminal.

In particular, in the sliding module 600 according to the second embodiment, the first magnetic substance 620 is attached to the separated sliding plate 610, and the sliding plate 610 is mounted on a seating surface 510 of the first housing 500. On the other hand, in the sliding module 900 of the third embodiment, the substance to be magnetized is formed on the first housing 800 during insert-injection molding of the first housing 800, instead of using the separate sliding plate 610 of the sliding module according to a second embodiment. It is noted that the same reference numerals indicate structural elements which are apparent from the preceding embodiments, and the description of the elements are omitted. In addition, it is easily understood that the driving force is generated by the attractive force and the repulsive force between the first and second magnetic substances 610 and 620, in the sliding module 900 according to the present embodiment. Therefore, the operation of the sliding module 900 according to the present embodiment will be omitted.

As described above, in the portable terminal having the sliding module according to the present invention, the first and second magnetic substances, instead of springs, are mounted in the first and second housings through insert-injection molding and magnetizing processes, thereby providing a miniaturized hinge unit, having a reduced number of parts and the size thereof, reducing the mounting space for the parts of the portable terminal, and decreasing the manufacturing cost. In addition, since the portable terminal has the first and second sliding guides, and the sliding shifter is movably coupled to the first and second sliding guide, the first housing can move in the longitudinal and transverse directions, so that the user can conveniently carry out voice communication, send a short message, and use the game content.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal having a sliding module, comprising:
   a first housing;
   a second housing coupled to the first housing while facing the first housing; and
   a sliding module interposed between the first and second housings, for connecting the first housing to the second housing so that the first housing linearly moves on the second housing, the sliding module including:
   a sliding plate disposed on a surface of the first housing and facing the second housing;
   a first magnetic substance mounted in the first housing comprising a first component extending in a longitudinal direction and a second component extending in a transverse direction; and
   a second magnetic substance mounted in the second housing comprising a first component extending in a longitudinal direction and a second component extending in a transverse direction and facing the first magnetic substance,
   wherein the first components of the first and second magnetic substances are arranged in a longitudinal direction along a first common axis and the second components of the first and second magnetic substances are arranged in a transverse direction along a second common axis of the first housing, respectively, so as to move the first housing in the longitudinal or transverse direction of the first housing by driving force caused due to attractive and repulsive forces between the first and second magnetic substances.

2. The portable terminal having a sliding module as claimed in claim 1, wherein the first and second magnetic substances have at least three polarities in the longitudinal and transverse directions of the first housing.

3. The portable terminal having a sliding module as claimed in claim 2, wherein when the first and second housings overlap each other, the attractive force is generated between the first and second substances so that the first housing closes a surface of the second housing.

4. The portable terminal having a sliding module as claimed in claim 1, wherein the first and second magnetic substances respectively include a permanent magnet.

5. The portable terminal having a sliding module as claimed in claim 1, wherein during processes of insert-injecting substance to be magnetized and mounting magnets, the first magnetic substance is mounted in the sliding plate while the second magnetic substance is mounted in the second housing.

6. The portable terminal having a sliding module as claimed in claim 1, wherein the sliding plate includes:
   a first sliding guide which is disposed on a surface of the sliding plate and extends in the longitudinal direction of the first housing; and
   a second sliding guide which is disposed perpendicular to the first sliding guide and extends in the transverse direction of the first housing.

7. The portable terminal having a sliding module as claimed in claim 6, further comprising an intersection guide at which one end of the first sliding guide intersects with one end of the second sliding guide.

8. The portable terminal having a sliding module as claimed in claim 7, further comprising a sliding shifter mounted on a surface of the second housing, wherein the first housing opens and closes a surface of the second housing as the sliding shifter moves while being engaged with the first and second sliding guides.

9. The portable terminal having a sliding module as claimed in claim 8, further comprising a first guide stopper formed at the other end of the first sliding guide, and a second guide stopper formed at the other end of the second sliding guide, wherein as the first and second guide stoppers limit a movement range of the sliding shifter, a movement range of the first housing is limited.

10. The portable terminal having a sliding module as claimed in claim 3, wherein the driving force for moving the first housing is generated by the attractive and repulsive forces caused between the first and second magnetic substances when the first housing moves in a state that the one surface of the second housing is closed.

11. The portable terminal having a sliding module as claimed in claim 1, wherein plate holes are defined along an edge of the sliding plate, through which screws pass to couple the sliding plate to the first housing.

12. The portable terminal having a sliding module as claimed in claim 8, wherein shifter hole are defined along an edge of the sliding shifter, through which screws pass to couple the sliding shifter to the second housing.

13. A portable terminal having a sliding module, comprising:
   a first housing;
   a second housing coupled to the first housing while facing the first housing; and
   a sliding module interposed between the first and second housings, for connecting the first housing to the second housing so that the first housing linearly moves on the second housing, the sliding module including:
   a sliding plate disposed on a surface of the first housing and facing the second housing;
   a first magnetic substance mounted in the first housing comprising a first component extending in a longitudinal direction and a second component extending in a transverse direction; and
   a second magnetic substance comprising a first component extending in a longitudinal direction and a second component extending in a transverse direction mounted in the second housing and moving on the sliding plate in directions that the first magnetic substance extends along common axes,
   wherein the first magnetic substance is arranged in longitudinal and transverse directions of the first housing, respectively, so as to move the first housing in the longitudinal or transverse direction of the first housing by driving force caused due to attractive and repulsive forces between the first and second magnetic substances.

14. The portable terminal having a sliding module as claimed in claim 13, wherein the first and second magnetic substances respectively include a permanent magnet.

15. The portable terminal having a sliding module as claimed in claim 13, wherein during processes of insert-injecting substance to be magnetized and mounting magnets, the first magnetic substance is mounted in the sliding plate while the second magnetic substance is mounted in the second housing.

16. The portable terminal having a sliding module as claimed in claim 13, wherein the sliding plate includes:
   a first sliding guide which is disposed on a surface of the sliding plate and extends in the longitudinal direction of the first housing; and
   a second sliding guide which is disposed perpendicular to the first sliding guide and extends in the transverse direction of the first housing.

17. The portable terminal having a sliding module as claimed in claim 16, further comprising an intersection guide at which one end of the first sliding guide intersects with one end of the second sliding guide.

18. The portable terminal having a sliding module as claimed in claim 17, further comprising a sliding shifter which includes the second magnetic substance and is mounted on a surface of the second housing, wherein the first housing opens and closes a surface of the second housing as the sliding shifter moves while being engaged with the first and second sliding guides.

19. The portable terminal having a sliding module as claimed in claim 18, wherein as the attractive force is generated between the first and second magnetic substances each time that the sliding shifter is positioned at the intersection guide, the first housing closes one surface of the second housing.

20. The portable terminal having a sliding module as claimed in claim 18, further comprising a first guide stopper formed at the other end of the first sliding guide, and a second guide stopper formed at the other end of the second sliding guide, wherein as the first and second guide stoppers limit a movement range of the sliding shifter, a movement range of the first housing is limited.

21. The portable terminal having a sliding module as claimed in claim 19, wherein the driving force for moving the first housing is generated by the attractive and repulsive forces caused between the first and second magnetic substances when the first housing moves in a state that the one surface of the second housing is closed.

22. The portable terminal having a sliding module as claimed in claim 13, wherein plate holes are defined along an edge of the sliding plate, through which screws pass to couple the sliding plate to the first housing.

23. The portable terminal having a sliding module as claimed in claim 18, wherein shifter hole are defined along an edge of the sliding shifter, through which screws pass to couple the sliding shifter to the second housing.

* * * * *